US012084857B2

(12) United States Patent
King et al.

(10) Patent No.: US 12,084,857 B2
(45) Date of Patent: Sep. 10, 2024

(54) PARTITION SUPPORT STRUCTURE MOUNTING TRACK

(71) Applicant: Quicktrak Ltd., Salford (GB)

(72) Inventors: Wayne King, Salford (GB); Lee Cross, Salford (GB); Chris Heaton, Salford (GB)

(73) Assignee: QUICKTRACK LTD., Salford (GB)

( * ) Notice: Subject to any disclaimer, the term of this patent is extended or adjusted under 35 U.S.C. 154(b) by 186 days.

(21) Appl. No.: 17/605,749

(22) PCT Filed: Apr. 24, 2020

(86) PCT No.: PCT/EP2020/061548
§ 371 (c)(1),
(2) Date: Oct. 22, 2021

(87) PCT Pub. No.: WO2020/216944
PCT Pub. Date: Oct. 29, 2020

(65) Prior Publication Data
US 2022/0205239 A1    Jun. 30, 2022

(30) Foreign Application Priority Data

Apr. 25, 2019 (GB) ..................................... 1905776

(51) Int. Cl.
*E04B 2/74* (2006.01)
*E04B 2/76* (2006.01)
(Continued)

(52) U.S. Cl.
CPC ............ *E04B 2/7457* (2013.01); *E04B 2/767* (2013.01); *E04B 2/789* (2013.01); *E04B 9/065* (2013.01);
(Continued)

(58) Field of Classification Search
CPC ........ E04B 2/7457; E04B 2/767; E04B 2/789; E04B 9/065; E04B 9/10; E04B 9/16;
(Continued)

(56) References Cited

U.S. PATENT DOCUMENTS

| | | | |
|---|---|---|---|
| 3,130,821 | A | 4/1964 | Dunlap |
| 3,297,345 | A | 1/1967 | Downing |

(Continued)

FOREIGN PATENT DOCUMENTS

| | | |
|---|---|---|
| EP | 2374953 | 10/2011 |
| EP | 3301238 | 4/2018 |

(Continued)

OTHER PUBLICATIONS

Examination Report—U.K. Intellectual Property Office, Application No. GB1905776.9, Aug. 16, 2021.

(Continued)

*Primary Examiner* — Rodney Mintz
(74) *Attorney, Agent, or Firm* — Jeffer Mangels; Butler & Mitchell LLP; Brennan C. Swain, Esq.

(57) ABSTRACT

The track is elongate such that it extends along a longitudinal axis. The track comprises an alignment feature located at a predetermined alignment position along the longitudinal axis of the track. The alignment feature is configured to secure a partition support member at the alignment position when the partition support member is received by the track. The alignment feature comprises one of a projection or recess configured to engage with the other of a projection or recess of the partition support member.

9 Claims, 7 Drawing Sheets

(51) Int. Cl.
*E04B 2/78* (2006.01)
*E04B 2/82* (2006.01)
*E04B 9/06* (2006.01)
*E04B 9/10* (2006.01)
*E04B 9/16* (2006.01)

(52) U.S. Cl.
CPC ................. *E04B 9/10* (2013.01); *E04B 9/16* (2013.01); *E04B 2/825* (2013.01)

(58) Field of Classification Search
CPC .... E04B 2/825; E04B 9/12; E04C 2003/0473; F16B 7/0493; F16B 2/248
See application file for complete search history.

(56) References Cited

U.S. PATENT DOCUMENTS

| | | | |
|---|---|---|---|
| 3,680,271 A | 8/1972 | Satchell | |
| 4,047,348 A | 9/1977 | McSweeney | |
| 4,193,245 A * | 3/1980 | Johnson | E04C 2/384 403/231 |
| 4,630,423 A | 12/1986 | Lind | |
| 4,918,899 A * | 4/1990 | Karytinos | E04B 1/5818 52/690 |
| 5,222,335 A | 6/1993 | Petrecca | |
| 5,325,651 A * | 7/1994 | Meyer | E04C 3/32 52/696 |
| 5,394,665 A * | 3/1995 | Johnson | E04C 3/32 52/745.1 |
| 5,930,968 A * | 8/1999 | Pullam | E04B 2/7457 52/690 |
| 6,568,138 B1 | 5/2003 | Frost | |
| 7,223,043 B1 * | 5/2007 | Andrews | E04B 2/766 403/230 |
| 8,074,416 B2 * | 12/2011 | Andrews | E04B 2/767 403/230 |
| 8,615,959 B2 * | 12/2013 | Ferguson | E04B 2/767 52/653.1 |
| 10,480,185 B1 * | 11/2019 | Attalla | E04B 2/767 |
| 2005/0011150 A1 | 1/2005 | Stackenwalt | |
| 2006/0144009 A1 | 7/2006 | Attalla | |
| 2006/0283130 A1 * | 12/2006 | Andrews | E04B 2/767 52/633 |
| 2007/0011971 A1 | 1/2007 | Sitkiewicz | |
| 2008/0053035 A1 | 3/2008 | Rosenberg | |
| 2008/0159807 A1 * | 7/2008 | Andrews | E04B 2/766 52/745.19 |
| 2008/0236068 A1 | 10/2008 | Jahn | |
| 2009/0272054 A1 * | 11/2009 | Swain, Jr. | E04C 2/20 52/309.1 |
| 2010/0218451 A1 * | 9/2010 | Andrews | E04B 2/767 52/655.1 |
| 2013/0000242 A1 * | 1/2013 | Ferguson | E04B 2/825 52/653.1 |
| 2015/0152632 A1 * | 6/2015 | Brodersen | E04B 2/767 52/850 |
| 2017/0037619 A1 * | 2/2017 | Dietzen | E04C 3/11 |
| 2019/0323226 A1 * | 10/2019 | LeBlang | E04B 2/7457 |
| 2020/0095767 A1 * | 3/2020 | Attalla | E04C 3/32 |
| 2022/0120078 A1 * | 4/2022 | Sobel | F16F 15/073 |

FOREIGN PATENT DOCUMENTS

| | | | | |
|---|---|---|---|---|
| GB | 2413834 A | * | 11/2005 | ........... E04B 2/7457 |
| WO | 2009106083 | | 9/2009 | |

OTHER PUBLICATIONS

Search Report—U.K. Intellectual Property Office, Application No. GB2115427.3, Dec. 2, 2021.

* cited by examiner

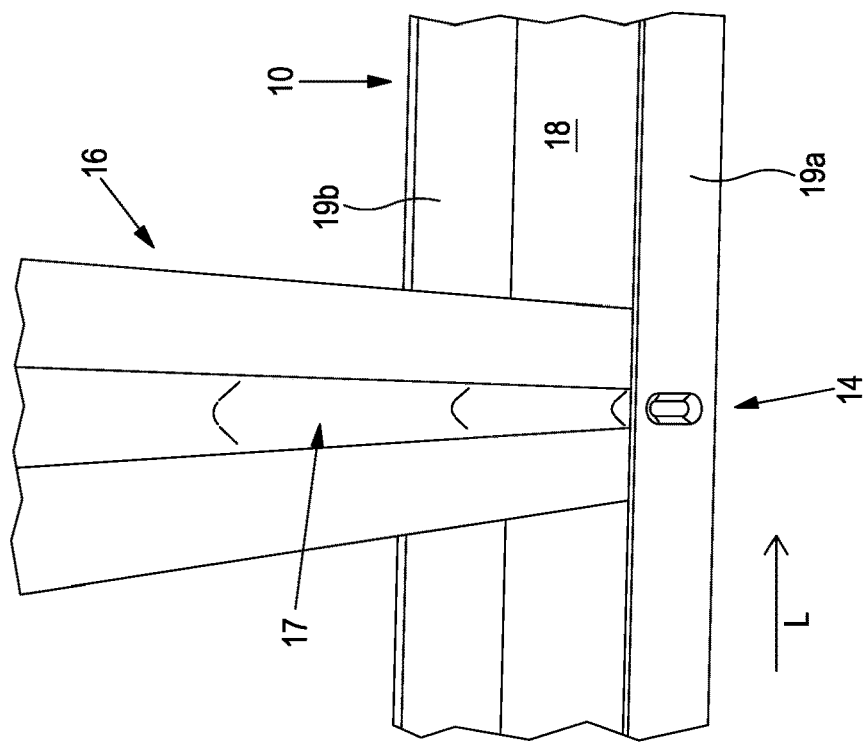
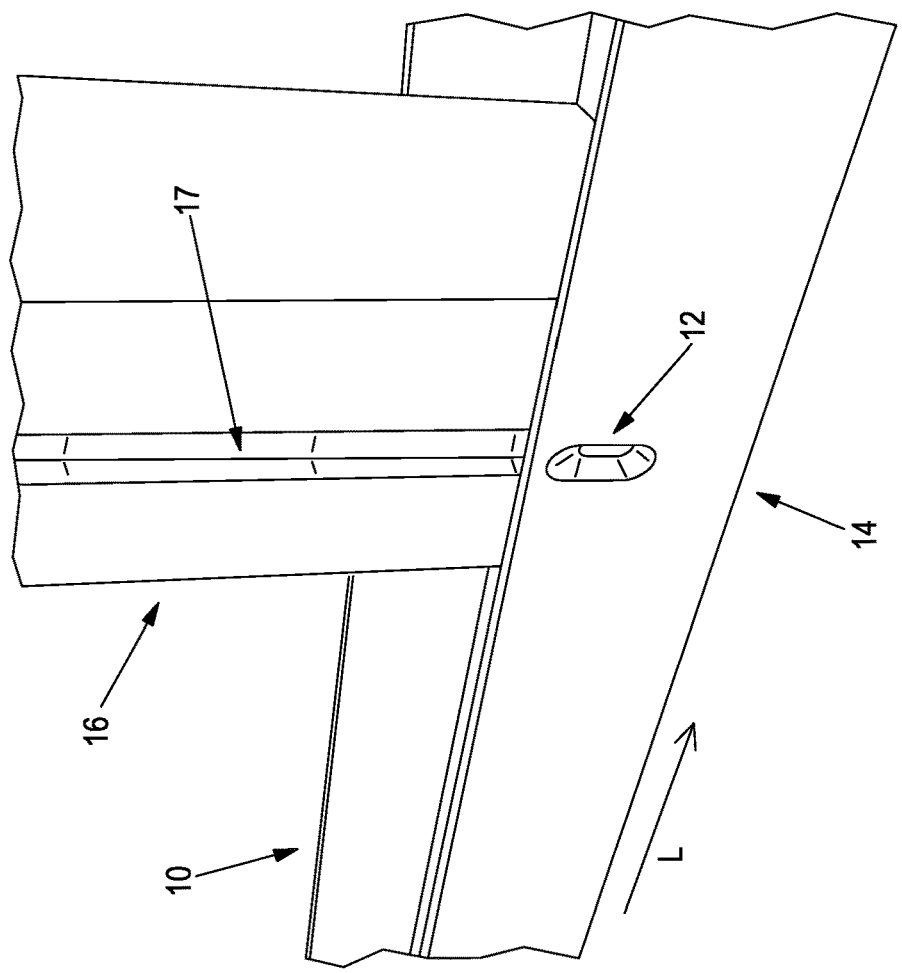

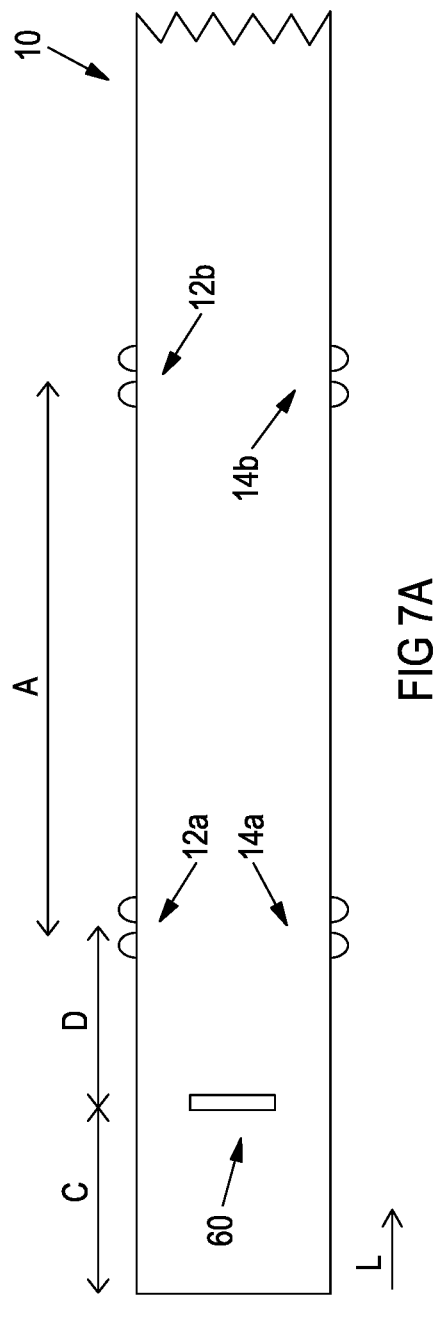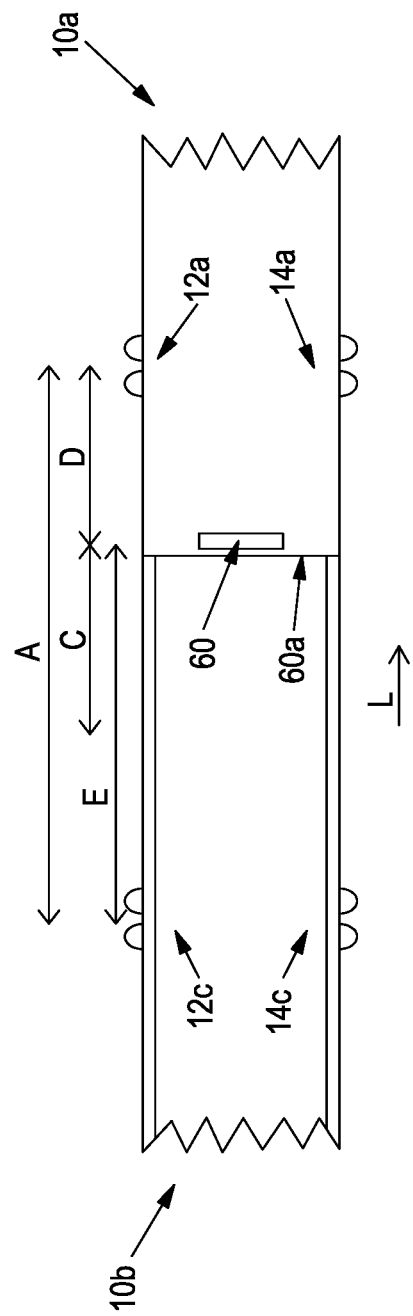

PARTITION SUPPORT STRUCTURE MOUNTING TRACK

The present invention relates to a partition support structure mounting track for use in building a partition support structure. In particular the mounting track has an alignment feature configured to secure a corresponding partition support member at a predetermined alignment position.

Partition systems are commonly used in the building of non-loadbearing structures such as partition walls and ceilings. In a typical partition system, tracks and support members are fixed at together to construct a partition support structure in the form of a frame, and then panels, such a wall panels or ceiling panels are fixed to the frame to form a partition.

Conventional wall and ceiling structures are typically built using drywall systems (e.g. folded edge (FEC) floor channels and Gypframe 'C' studs, supplied by Saint-Gobain Construction Products UK Ltd) and MF (metal frame) ceiling systems (e.g. CasoLine MF, again supplied by Saint-Gobain Construction Products UK Ltd) respectively. In conventional drywall systems, studs are placed upright in a horizontal floor and/or ceiling track to form a frame which supports the wall panels. In conventional MF ceiling systems, primary support tracks/channels are fixed in place and secondary support members (also known as ceiling sections) are suspended perpendicular to and underneath the primary support tracks to form a frame which supports the ceiling panels. The ceiling sections may be suspended underneath the primary support channels using connecting clips.

While conventional partition systems are well utilized, they have some limitations. In particular the frame must be carefully aligned. This results in the skilled operative spending much time measuring track spacing and alignment, for example using a tape measure and laser level, in order to correctly align the frame.

Furthermore, in a building environment there may be different operatives working within the same site, some of whom may need to temporarily disassemble (or move portions of) an assembled and correctly aligned frame, for example to temporarily gain access to an area. To finish building the partition structure, the associated operative must then return the frame to its original correct alignment before the relevant panels are attached to the frame, which may be a time consuming process.

It is one object of the present invention to obviate or mitigate one or more disadvantages of known partition systems, whether mentioned above or otherwise. It is also an object of the present invention to provide for an improved or alternative partition support structure.

SUMMARY OF INVENTION

According to a first aspect of the invention there is provided, a partition support structure mounting track, the track being elongate such that it extends along a longitudinal axis, and the track comprising an alignment feature located at a predetermined alignment position along the longitudinal axis of the track, the alignment feature configured to secure a partition support member at the alignment position when the partition support member is received by the track, and the alignment feature comprising one of a projection or recess configured to engage with the other of a projection or recess of the partition support member.

The alignment feature may provide a quick and easy means of mounting a support member at the alignment position. The alignment feature may provide a means of mounting a support member at the alignment position without the need for additional fixing elements, thereby reducing the amount of material needed to construct a partition support structure.

The alignment feature may further configured to releasably secure a partition support member at the alignment position. That is to say, the securing carried out by the alignment feature may be a releasable securing. The alignment feature may allow the track and support member to be releasably (or reversibly) fixed and separated without permanently altering the shape or structure of the track or support member.

The alignment feature may releasably secure the partition support member to the track at the alignment position, for example by virtue of a clipping fit, an interference fit or a transition fit. Alternatively the alignment feature may permanently or semi-permanently secure the partition support member to the track at the alignment position, for example by virtue of a locking mechanism or fit. The securing and/or releasing may be accomplished without the use of tools.

The partition may be a wall such that the partition support member is a wall element support member.

The track may define a channel extending along the longitudinal axis.

The alignment feature may be configured to secure the partition support member at the alignment position when the support member is received in the channel.

At least a portion of the alignment feature may be resiliently deformable such that when the alignment feature secures the partition support member at the alignment position and/or when the alignment feature secures the partition support member at the alignment position, said at least a portion of the alignment feature is resiliently deformed.

The track may comprise a base and first and second side flanges which extend from the base and cooperate to define said channel.

The first and second side flanges may extend from opposite long edges of the elongate base. The side flanges may extend generally perpendicular to the base. The side flanges may each extend in substantially the same direction from the base i.e. make a generally square 'C' shape cross-section, or may each extend in two directions from the base i.e. make a generally 'I' shape cross-section. The track may be open at distal ends of the elongate track. The base and flanges may be continuous from one end of the elongate track to the distal end of the track. Alternatively, the base and/or first flange and/or second flange may be discontinuous.

The alignment feature may be located on at least one of: the first side flange, the second side flange and the base.

The track may further comprise a second alignment feature spaced from the first alignment feature along the longitudinal axis by a predetermined alignment length.

The second alignment feature may be substantially identical to the first alignment feature.

The alignment feature may be spaced along the longitudinal axis from a first longitudinal end of the track by a second predetermined alignment length.

The first alignment length or second alignment length may be one of: approximately 30 cm (11.8 inches), approximately 40 cm (15.7 inches) or approximately 60 cm (23.6 inches).

The alignment length may be any appropriate length. The alignment length may be chosen so as to comply with industry standards in a particular jurisdiction. The alignment length may be chosen so as to comply with commonly available partition structure components in a particular jurisdiction.

The partition support member may be a C-stud.

The alignment feature is a projection configured to project into a portion of a sight line of said C-stud.

According to another aspect of the invention, there is provided a partition support structure comprising a track according to any preceding claim, a partition support member, and a partition element, wherein the track receives the partition support member at the alignment position, and the partition element is supported by the partition support member.

The partition support structure may comprise a track having a second alignment feature spaced from the first alignment feature along the longitudinal axis by a predetermined alignment length. The partition support structure may further comprise a second partition support member. The track may receive the second partition support member at the second alignment position, and the partition support member and second partition support member may support the partition element between the partition support member and second partition support member.

The partition may be a ceiling such that the partition support member is a ceiling element support member.

The partition support member may be in the form of a clip.

The clip may be configured to support a corresponding elongate ceiling support generally perpendicular to the track.

The clip may be any suitable connector or fastener. The clip may be formed from a length of elongate material, for example a tensioned wire structure. The valley may have a similar width to the width of a portion, e.g. central portion, of the clip. The valley may be notch-shaped. The valley may be rounded (e.g. have a U-shaped cross-section). The valley may comprise a recess in a wall of the track. The valley may be formed between a plurality of protrusions that protrude from a wall of the track.

The alignment feature may be configured to urge the support member towards a centre of the alignment feature when the support member is received by the track.

The alignment feature may comprise a recess in the form of a valley configured to urge a projection in the form of a portion of the clip towards a centre of the alignment feature when the clip is received by the track.

The alignment feature may comprise two protrusions spaced from one another along the longitudinal axis and forming said valley therebetween.

The protrusions may be of any shape, for example conical, half-spherical, or elongated ridges. The protrusions may be spaced by a width approximately equal to the width of the portion of the support member (e.g. clip). The spacing between adjacent protrusions may be chosen so as to comply with commonly available partition structure system components. For example, the spacing between adjacent protrusions may be chosen to approximately match the width of a conventional clip. The spacing between adjacent protrusions may be approximately 2.65 mm (0.1 inches).

The valley may be configured to receive a portion of a conventional MF9 clip.

The track may comprise a base and first and second side flanges extending from the base such that the track has a generally U-shaped cross-section in a plane perpendicular to the longitudinal axis of the track.

The alignment feature may be located on at least one of: the first side flange; the second side flange and the base.

The track may further comprise a second alignment feature spaced from the first alignment feature along the longitudinal axis by a predetermined alignment length.

The second alignment feature may be substantially identical to the first alignment feature.

The track may further comprise a first datum feature at a first longitudinal end of the track and a second datum feature at a second longitudinal end of the track, wherein the first datum feature of the track is configured to engage with the second datum feature of a second track, identical to the track, when the track and second track are placed in an adjacent, overlapped relationship with one another, wherein the engagement of the first and second datum features restricts relative longitudinal movement between the track and second track and locates a second alignment feature of the second track such that it is longitudinally spaced from the alignment feature of the track by a predetermined alignment length.

The track may have a track length defined as the extent of the track along the longitudinal axis. The track length may be 3.3 m (3.3 feet) or 3.75 m (12.3 feet). The track length may be chosen so as to comply with industry standards in a particular jurisdiction. The track length may be chosen so as to allow for a predetermined length of overlap between the first and second track and/or a predetermined total length of the first and second track when overlapped by a predetermined length.

According to another aspect of the invention there is provided an extended track arrangement comprising the track and second track referred to in the paragraph above wherein the first and second datum features are in engagement, and wherein the alignment feature of the track is spaced from the second alignment feature of the second track by a predetermined alignment length.

The predetermined alignment length may be 45 cm (17.7 inches). Any appropriate alignment length may be used. The alignment length may be chosen so as to comply with industry standards in a particular jurisdiction. The alignment length may be chosen so as to comply with commonly available partition structure system components.

According to another aspect of the invention, there is provided a partition support structure comprising a track according to one of the previous aspects of the invention, a ceiling element support member, a ceiling support and a ceiling element; wherein the ceiling element support member is received by the track at the alignment position, the ceiling support is supported by the ceiling element support member such that the ceiling support is generally perpendicular to the track, and the ceiling element is supported by the ceiling support.

The partition support structure may comprise a track according to one of the previous aspects of the invention, and may further comprise a second ceiling element support member and a second ceiling support.

The second ceiling element support member may be received by the track at the second alignment position. The second ceiling support may be supported by the second ceiling element support member such that the second ceiling support is generally perpendicular to the track. The ceiling element may be supported between the ceiling support and the second ceiling support.

Where appropriate, any of the optional features discussed above in relation one aspect of the invention may be applied to another aspect of the invention.

BRIEF DESCRIPTION OF THE DRAWINGS

Specific embodiments of the present invention will now be described, by way of example only, with reference to the accompanying drawings in which:

FIGS. 1A and 1B show a mounting track according to an embodiment of the present invention and a support member for use in constructing a partition wall;

FIGS. 7A and 7B schematically depict a mounting track and a pair of mounting tracks, respectively, for constructing a ceiling.

DETAILED DESCRIPTION

Figure 2:
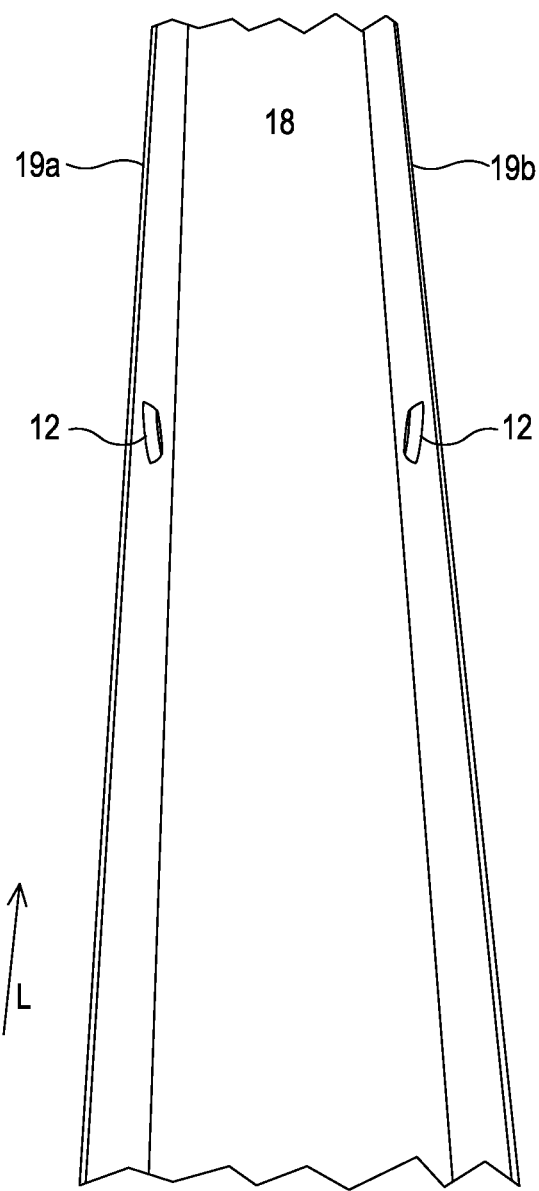
FIG. 2 shows the inner surface of the mounting track according to an embodiment of the present invention.

FIGS. 1A and 1B illustrate a mounting track for use in building a partition support structure in accordance with an embodiment of the invention. The track 10 is elongate and extends along a longitudinal axis L. The longitudinal axis L may also be known as the elongate direction. The track comprises an alignment feature 12 which is located at a predetermined alignment position 14 along the longitudinal axis. The alignment feature 12 is configured to secure a corresponding support member 16.

In this example, the track 10 comprises three portions: a base 18, and first and second side flanges 19a, 19b which each extend from the base. The first and second side flanges 19a, 19b are generally parallel to each other, and are generally perpendicular to the base 18. The base 18 and opposing side flanges 19a, 19b cooperate to form a channel. The channel can be said to be C-shaped or to have a C-shaped cross-section. The base 18 and opposing side flanges 19a, 19b extend along the longitudinal axis L, hence defining a channel extending along the longitudinal axis L.

The channel can be said to be defined by an 'inner surface' of the track 10, where the inner surface comprises a first surface of the base 18, a first surface of the first side flange 19a, and a first surface of the second side flange 19b, where the first surfaces of the first and second side flanges face each other, and the first surface of the base adjoins the two first faces of the first and second side flanges. By contrast, an outer surface of the track 10 may be said to comprise second surfaces of the first and second side flanges, where the second surfaces of the first and second side flanges face away from each other, and a second surface of the base, where the second surface of the base adjoins the second surfaces of the first and second side flanges.

In this instance the side flanges 19a, 19b each extend only in one direction away from the base 18, hence forming a C-shaped track 10 defining a single channel. In some instances it may be beneficial for the side flanges 19a, 19b to extend in two generally opposed directions from the base such that they form an "I" shaped track which defines two channels separated by the base. The outer surface of an "I" shaped track comprises the second surfaces of the first and second side flanges, where the second surfaces of the first and second side flanges face away from each other, but does not comprise the second surface of the base. Instead, the second surface of the base cooperates with the flanges to define a second channel.

The track 10 is configured to receive a corresponding partition support member 16 within the channel. As such, the alignment feature 12 is associated with (or located on) the inner surface of the track 10. In this example, the alignment feature, which can be seen more clearly in FIG. 2, is a projection in the form of a protrusion 12 which extends into the channel.

In use, the track may be fixed to the floor in a position which corresponds to the desired location of a wall partition. The track may be fixed to the floor in any appropriate manner as is well known in the art.

The track 10 may be configured to receive a common partition support member 16 typically used in partition structures. For example, the track 10 may be configured to receive a metal stud 16. Studs (for example 'C' studs) are commonly used as the upstanding or vertical support members in drywall partition wall systems and typically have standard widths, for example 52 mm (2.04 inches), 72 mm (2.83 inches), 92 mm (3.62 inches) or 148 mm (5.83 inches). By providing a track 10 with a channel of a similar width to the stud 16 being used allows the stud 16 to be supported within the channel. If an end of the support member is perpendicular to a longitudinal axis of the support member, then, when the support member is stood on the end within the channel, the support member will extend at right angles to the longitudinal axis of the track 10, for example supporting the stud 16 so that it is vertical while the track 10 is horizontal. It can be imagined that, if the width of the support member 16 is similar to the width of the channel, any pitching movement of the support member 16 will be limited by the side flanges 19a, 19b, such that the support member 16 is held upright.

In a portion of the track 10 with no alignment features 12, the support member 16 may be slidable along the longitudinal axis L while being held upright, with very little resistance to such sliding movement.

Providing an alignment feature in the form of a protrusion 12 extending into the channel reduces the width of the channel around the alignment position 14. As the support member 16 has a width similar to that of the width of the channel with in the absence of protrusions, when the support member is located adjacent the protrusion, and given that the side flange of which the protrusion forms part is resiliently deformable, the protrusion 12 may exert an urging force (which is generally parallel to the width of the track), to the support member to hold it in place along the longitudinal axis L. That is, the protrusion 12 engages with the support member 16 to secure the support member 16 to the track at the alignment position 14. In this embodiment, such securing of the support member at the alignment position is releasable due to the resiliently deformable nature of the track. This will be discussed in more detail below.

The support member 16 may have an alignment feature which corresponds to that of the track. The alignment feature of the support may have a smaller width, i.e. similar to the width of the channel at the location of the protrusion 12 at the alignment position 14. The corresponding alignment feature of the support member 16 may be formed as a corresponding recess or indentation in the support member 16. In this instance, the protrusion 12 of the track may engage with (or be received by, or locate within) the corresponding recess and hence hold the support member in place at the predetermined alignment position along the longitudinal axis of the track.

In known partition structure systems, for example drywall systems, studs are inserted into a floor track with no alignment features. Consequently, to secure a stud at an alignment position, additional methods are required. In known methods, first, the relevant alignment position along the track has to be determined. For example, the partition installer may want a certain number studs per wall partition element (e.g. per sheet of plasterboard). The installer will then calculate the required spacing between studs. Furthermore, the correct stud location may be determined by the location of other features or partition locations within the room concerned. Once the correct alignment position for a particular stud has been determined, its position along the track may be measured. The alignment position may then be marked on the track and/or the stud may be moved into the correct position.

It is an advantage of the present invention that no determination of the correct alignment position for a particular stud is required. To the contrary, a track according to the present invention already has alignment features located at respective predetermined alignment positions along the length of the track. As such, once the track has been installed, all that is required is that the support members are inserted into the channel and then moved to their respective alignment position, where through the action of the alignment feature, they are automatically releasably secured to the track.

Returning again to known partition structure installation methods, once the stud is at the correct position along the track the stud may be secured by drilling into the track and stud and inserting a screw (or by simply screwing a self-tapping screw directly through both), which results in both the track and stud being deformed. Alternatively, the stud may be secured by crimping the stud and track with a stud crimper which punches a hole through both stud and track and deforms the metal to form a join, again resulting in deformation of the track and stud. It is an advantage of the present invention that the securing mechanism (i.e. the alignment feature 12) does not result in (plastic) deformation of either the track 10 or a stud 16. Additionally, the track of the present invention allows initial installation of a frame with no need for additional equipment such as screws, tools or a stud crimper.

Furthermore, in a building environment there may be different operatives working within the same site, some of whom may need to temporarily disassemble the frame after it has initially been installed, for example to temporarily gain access to an area. An example may be an electrician disassembling a frame to insert wiring within a wall structure. In this instance, the above methods of securing a stud to the track are problematic. If the frame has been screwed in place, it may be very time consuming to unscrew and move all the relevant parts and then reassemble. If the frame has been crimped in place, then this process permanently deforms the metal so the join cannot be undone without damaging the track and/or stud. To the contrary, because the present invention releasably secures the support member to the track, if it is required to temporarily disassemble the frame, the support members can be slid along the track away from their respective alignment positions and out of the way. In order to achieve this, all that is required is for the operative to apply sufficient force to the support member so that the urging force provided by the alignment feature is overcome. No tools are required. Furthermore, once it is desired to relocate the support members into their respective original (alignment) positions, all that is required is to slide the support members back along the track until the respective alignment feature of the track re-engages to once again releasably secure support member to the track at the respective alignment position. Once all work on site which may require temporary movement of the support members has been completed, the partition installer may return and permanently secure the support members to the track using screws, crimping or any other appropriate method. The partition elements can then be fixed to the support members using any appropriate method as is well known to a person skilled in the art.

In alternative embodiments, the alignment feature may be configured such that it permanently secures the support member at the alignment position. For example, a locking mechanism may be provided such that, once the support member is inserted into the track and positioned at the alignment position, it is permanently secured. Such locking mechanisms may include a resiliently biased locking member on one of the track or support member, and a recess on the other of the track or support member. The resiliently biased locking member may be operable such that it is biased towards a projected or locked state. As such, when inserting the support member into the track and locating the support member at the alignment position, the biased locking member may retract until it comes into contact with the recess, at which point it projects into the recess and locks in place, such that the locking member can no longer move out of the locked state.

Many types of locking mechanisms which will be known to a person skilled in the art may be used, for example mechanical fasteners such as bayonet mounts and latches. An alignment feature may also be configured such that it semi-permanently secures the support member at the alignment position. Semi-permanent in this instance is intended to mean that the support member is not intended to be released in normal use, but that if required it may be released without permanently damaging the support member or track. Semi-permanent may mean that the support member cannot be simply slid along the track as with the releasable embodiment, but that it can be released by the user if needed. For example, with a resiliently biased locking member similar to that discussed above, the locking member may be depressed such that it releases from the recess and can be removed (thereby allowing the support member to be removed). In some embodiments, a releasable alignment feature may be considered to allow some limited movement along the longitudinal axis of the support member along the track, but preferentially secure the support member at the alignment position. A permanent or semipermanent alignment feature may be considered to generally inhibit movement of the support member along the longitudinal axis once it has been secured.

An alignment feature as described above, whether permanently securing or releasably securing, may be beneficial as the frame (partition support structure) can be assembled without the need for any additional parts, for example screws or other fasteners. In some partition building applications, it is necessary to permanently secure the frame. Using methods known in the art (as opposed to those of the present invention), this greatly increases the number of parts required to assemble a permanently secured frame (for example, due to fasteners). A greater number of parts results in a higher complexity, as well as higher cost. A greater number of parts also results in a greater amount of material required, for example a large volume of extra metal is required to provide the copious number of screws needed. A track comprising an alignment feature as described above reduces or eliminates the need for these additional parts.

The example depicted in FIGS. 1 and 2 comprises an alignment feature 12 that protrudes into the channel, but does not protrude from the outer surface of the track 10. When using screws to secure support members to a track, the screw head may protrude from the outer surface of the track. As a result, when fixing partition elements to the support structure, the protruding screw heads may cause an obstruction and/or undesirable forces to be exerted on the partition elements. In extreme cases this can result in undesired bumps and/or cracks in the final partition structure. Advantageously, using a track 10 according to this embodiment of the invention ensures there are no protruding features on the outer surface of the track 10, which may result in a partition structure with a higher quality finish.

The alignment feature 12 may be provided to any part of the track 10, for example the base 18, or either side flange 19a, 19b. In the depicted example the alignment feature 12 is located the first side flange 19a but it should be understood that it may be provided instead on the second side flange 19b or on the base 18. The alignment feature 12 may be located on multiple portions of the track 10, for example the alignment feature 12 may comprise a protrusion on both first and second side flanges as depicted in FIG. 2.

In some embodiments different alignment features may be located on different portions of the track. For example, a first set of alignment features which correspond to a first predetermined distance between adjacent alignment features may be located on a first portion of the track (e.g. the first side flange); whereas a second set of alignment features which correspond to a second predetermined distance between adjacent alignment features may be located on a second portion of the track (e.g. the second side flange).

An alignment feature 12 in the example depicted in FIG. 2 comprises a projection formed in the first side flange 19a which takes the form of a protrusion of the inner surface of the track. In the present example, the alignment feature is such that a recess corresponding to the protrusion is formed in the outer surface of the track. This has the benefit that it is possible to view the location of the alignment feature by looking at the outer surface of the track. In other embodiments any appropriate visual indicator may be provided on an outer surface of the track to indicate the location of an alignment feature.

Instead of an alignment feature including a protrusion on one surface of a side flange or base, and a corresponding recess on another surface of said side flange or base, the recess or protrusion may be formed only on one surface (e.g. inner surface or outer surface) of a flange 19a, 19b and/or the base 18, for example through moulding. Alternatively a protruding feature may be affixed to one or more surfaces of the channel, for example by attaching a protruding member using adhesive, welding or the like.

In the embodiment shown in FIG. 2, the alignment feature comprises a projection formed in the first side flange, as discussed above, and a second projection, substantially identical to the first projection, but formed in the second side flange. As already discussed, in other embodiments, the alignment feature may comprise any number (one or more) projections or recesses which are located at any appropriate location on the track (e.g. base, first side flange and/or second side flange).

The alignment feature 12 in the examples depicted in FIGS. 1 and 2 comprises an elongate protrusion 12. That is, the protrusion 12 has a relatively small extent in the longitudinal axis L but extends a relatively much greater length along the flange 19a in a direction perpendicular to the longitudinal axis L (i.e. in the same direction that the flange extends away from the base). This type of elongate protrusion 12 is particularly suitable for use with a conventional support member 16 known as a C-stud. C-studs are well known in the art and are studs formed with a base and two side flanges forming an angular C-shaped channel. Many common C-studs have a groove 17 formed down the outer surface of both side flanges. The groove constitutes an elongate recess on the outer surface of the channel. The groove may be provided to aid alignment of partition elements/boards onto the frame. The groove may be referred to as a sight line. The groove may additionally or alternatively be provided to increase the strength and/or flexibility of the stud.

In use, a C-stud 16 may be inserted into (or received by) a track 10 of the present invention, as best seen in FIGS. 1A and 1B. When inserted, the protrusions 12 at the alignment position 14 engage with the groove 17 on each side of the C-stud 16 and hence secure the C-stud 16 to the track at the alignment position 14. Due to the elongate nature of the groove in the C-stud 16, an elongate protrusion 12 in the side flange 19a of the track 10 may cooperate with the groove along a more substantial area and therefore provide a better engagement and securing force. In this embodiment, the C-stud is releasably secured and can be removed from engagement with the protrusions by applying sufficient force to the C-stud so that it move longitudinally out of engagement with the alignment feature, or by sliding C-stud in a direction perpendicular to the longitudinal axis and away from the base of the track.

It should be understood that, while in this example a protrusion 12 is provided in the inner surface of the track 10 to cooperate with a groove in the support member 16, a similar effect may be achieved by providing a recess in the inner surface of the track 10 to cooperate with a protrusion in the support member 16. However, the use of a protrusion 12 in the track 10 is particularly advantageous as, due to the shape of conventional support members 16 (e.g. C-studs), it may be utilised with pre-existing partition support members. That said, the use of a recess 12 in the track 10 may be advantageous for use with an alternative support member 16 (of unconventional type) which may feature a projection.

Figure 3A:
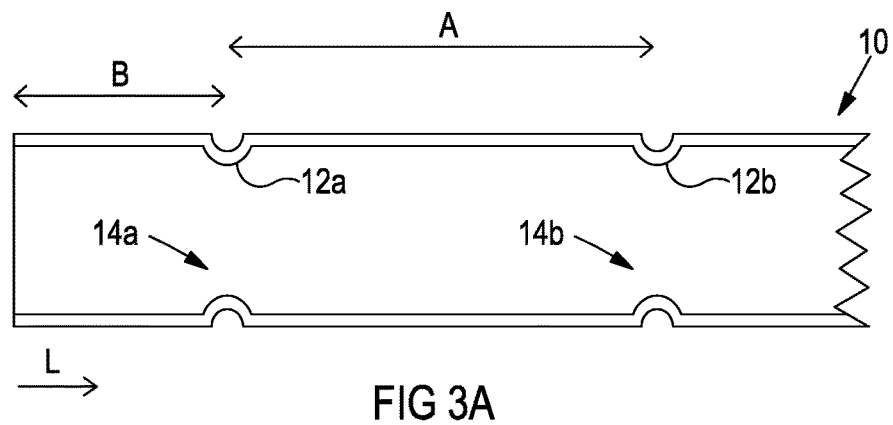
FIGS. 3A and 3B schematically depict a portion of a mounting track according to an embodiment of the present invention.
Figure 3B:
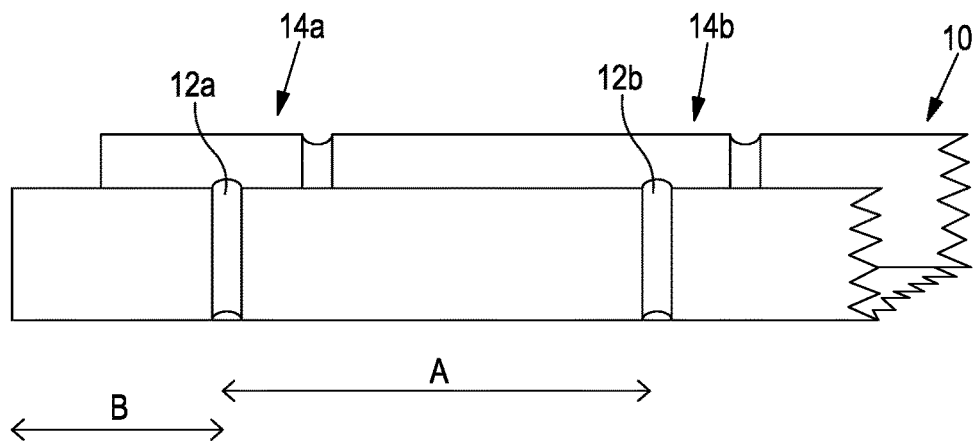
Figure 3C:
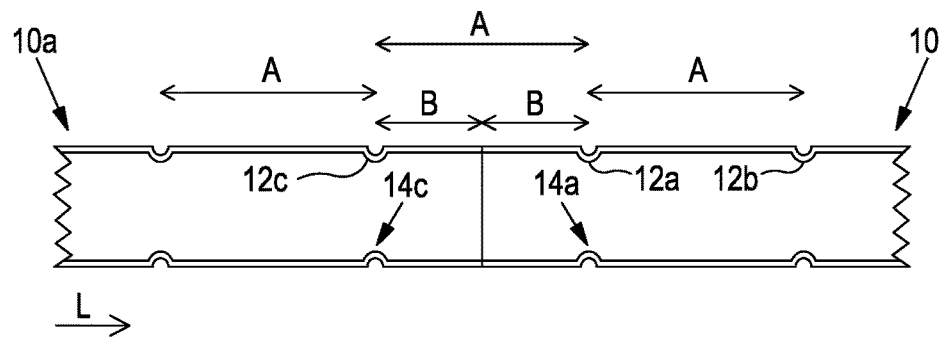
FIG. 3C schematically depicts two mounting track portions arranged end to end.

The track 10 may comprise a second alignment feature 12b as best seen in FIGS. 3A-C. In this example, the track 10 has a first alignment feature 12a at a first predetermined alignment position 14a and a second alignment feature 12b at a second predetermined alignment position 14b. A benefit of a track 10 comprising multiple alignment features 12 at predetermined positions is that the spacing of the alignment features (and hence of any secured support members) may also be predetermined. That is, a support member may be inserted at the first alignment position 14a and a second support member may be inserted at the second alignment position 14b such that the spacing between the first and second support members is predetermined. As such, a partition support structure may be easily and quickly assembled with correct alignment and spacing.

Building regulations and conventions require specific spacing between support members within a partition support structure, for example the spacing between studs in a partition wall frame. Typically, a spacing of 30 cm (11.8 inches) is required. However, in specific types of wall other spacings may be used, for example 40 cm (15.7 inches) or 60 cm (23.6 inches). Typically, an equal spacing between each support member is required i.e. the spacing between a first and second support member is the same as a spacing between a second and third support member and so on. As such, it may be beneficial to provide a track 10 with a plurality of alignment features 12 equally spaced by a predetermined distance, for example 30 cm (11.8 inches). Of course, any predetermined spacing distance may be chosen. For example, the distance may be chosen based on the building regulations of the market for which the track is intended.

FIGS. 3A-C show a track 10 where the first and second alignment locations 14a, 14b, and hence first and second alignment features 12a, 12b, are spaced by an alignment length A. In a preferred example, this alignment length is 30 cm (11.8 inches). By inserting a first and second support member into the channel at first and second alignment locations 14a, 14b, a frame may be formed where first and second support members are spaced by an alignment length A. It should be noted that the alignment length A is measured along the longitudinal axis L.

The track 10 may be manufactured, and hence provided to the user, in predetermined lengths. However, the user may wish to build a partition structure longer than the length of one track. In this instance, two or more tracks may be laid in end to end abutment along the longitudinal axis L to form an extended track arrangement, a portion of which is best seen in FIG. 3C.

The tracks may be configured (e.g. manufactured) such that an alignment feature 12a, 12c is spaced from an end of its respective track 10, 10a by a predetermined spacing length B. Hence, when a first track 10 with a first alignment feature 12a is laid in abutment with a second track 10a with a third alignment feature 12c, the spacing between the first alignment feature 12a and third alignment feature 12c will be 2×B. The spacing length B can further be configured such that B=A/2 and hence the spacing between the first alignment feature 12a and the third alignment feature 12b is equal to the alignment length A (i.e. the length between the first and second alignment features 12a, 12b of the first track 10). In this way, an extended track arrangement of any desired length may be assembled with equally spaced alignment features each spaced by an alignment length A.

In a specific example, the alignment length is 30 cm (11.8 inches) and the spacing length is 15 cm (5.9 inches).

Figure 4:
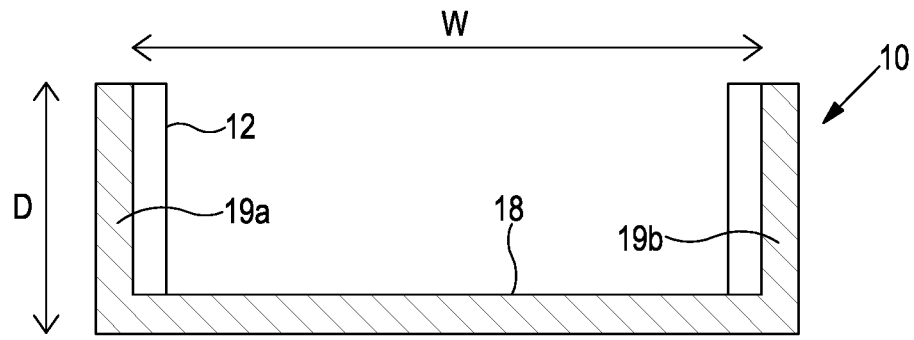
FIG. 4 schematically depicts a cross-section of a mounting track, viewed along a longitudinal axis.

FIG. 4 shows an example track 10 as viewed along the longitudinal axis, showing a cross-section of the channel formed by the side flanges 19a, 19b, and the base 18. The channel has a width W measured as the spacing between the side flanges 19a, 19b measured perpendicular to the plane of the flanges 19a, 19b. The channel has a depth D defined as the depth of the side flanges 19a, 19b measured perpendicular to the plane of the base 18. The width W and depth D of a track 10 may be any appropriate length depending on the user's requirements.

As mentioned above, studs commonly used as the vertical support members in drywall partition wall systems typically have standard widths, for example 52 mm (2.04 inches), 72 mm (2.83 inches), 92 mm (3.62 inches) or 148 mm (5.82 inches). As such, providing a track 10 with width W similar to the width of a typical stud will allow the stud to be received by the channel. By providing tracks with different widths W, the track 10 may be used with a range of sizes of conventional support members. It can be seen that the width in the area of a protrusion 12 (of an alignment feature) is smaller than the width W of the track 10. As previously discussed, the protrusion 12 may be received by a corresponding recess (e.g. sight line) in a support member.

The side flanges 19a, 19b may resist pitching rotation (either along the longitudinal axis or perpendicular thereto) of a support member received by the channel. A longer side flange 19a, 19b, i.e. a track 10 with a larger depth D, may provide more stability by resisting pitching rotation to a greater extent. The depth D may be, for example, 25 mm (0.98 inches), 50 mm (1.97 inches) or 70 mm (2.76 inches).

In operation, a support member 16 may be inserted into the track 10 such that it is received by the channel and such that the alignment feature 12 engages with a corresponding alignment feature on the support member 16. The support member 16 may be inserted perpendicularly to the longitudinal axis L. For example, with reference to FIG. 1, the support member 16 may be inserted such that the groove in the support member 16 slides along, and hence engages with, the protrusion 12 in the track 10. Alternatively, the support member 16 may be inserted into the track 10 at a non-perpendicular angle to the longitudinal axis L and then rotated (or pitched) into alignment (for example, such that the longitudinal axis of the support is generally perpendicular to the longitudinal axis L of the track).

A track 10 according to the above embodiments may be used to build a partition structure such as a wall. In use, one or more tracks according to the invention may be secured to the floor. This may be known as a floor track. A corresponding track (or tracks) may be mounted above the floor tracks, for example on the ceiling. In this instance the track on the ceiling may be referred to as a head track. In some applications only one of the floor track(s) or head track(s) may be tracks according to the present invention. In other applications, both the floor track(s) and head track(s) may be tracks according to the present invention.

In such applications, a first alignment feature on the first floor track may be vertically aligned to a first alignment feature of the first head track, for example with a laser alignment tool, although, of course, any appropriate alignment method may be used. This may ensure all alignment features are subsequently aligned on the floor and head track(s), thereby enabling a support member (e.g. C-stud) to be received vertically between an alignment feature on the floor track and a corresponding alignment feature on the head track.

Alternatively (or in addition), the alignment feature on a first track may be used to align multiple parallel (laterally spaced) tracks (all of which are floor tracks or all of which are head tracks), by aligning the alignment feature of the first track with a corresponding alignment feature of each of the parallel tracks.

To aid these alignment processes, for example to speed up and/or increase the accuracy of alignment processes, a visible marker may be provided at one or more alignment positions. The marker may indicate a suitable position/portion to be aligned by an alignment tool such as a laser alignment tool or a length of line. Advantageously, this marker may be located at the predetermined alignment position. The marker may be associated with the alignment feature. For example, in the depicted example a projection is provided on the inner surface of the track and a corresponding recess is provided on the outer surface of the track at the alignment position.

Alternatively the marker may be a separate feature to the alignment feature. The marker may be a projection or a recess or any other sort of visible mark. For example, the marker may take the form of a feature which is printed, painted or affixed to the track. The marker may be located at an appropriate marker position along the length of the track. Of course, for alignment to be possible, all of the tracks to be aligned will have been manufactured such that the marker position is the same for each.

Support members, for example studs, may then be inserted at each alignment position to form a support structure (i.e. a frame) with relative ease and speed due to the engagement between the support members and the alignment features. When appropriate, the support members can then be secured to the tracks in a more permanent manner. Partition members such as boards may then be mounted onto the frame to form a partition wall.

Figure 5:
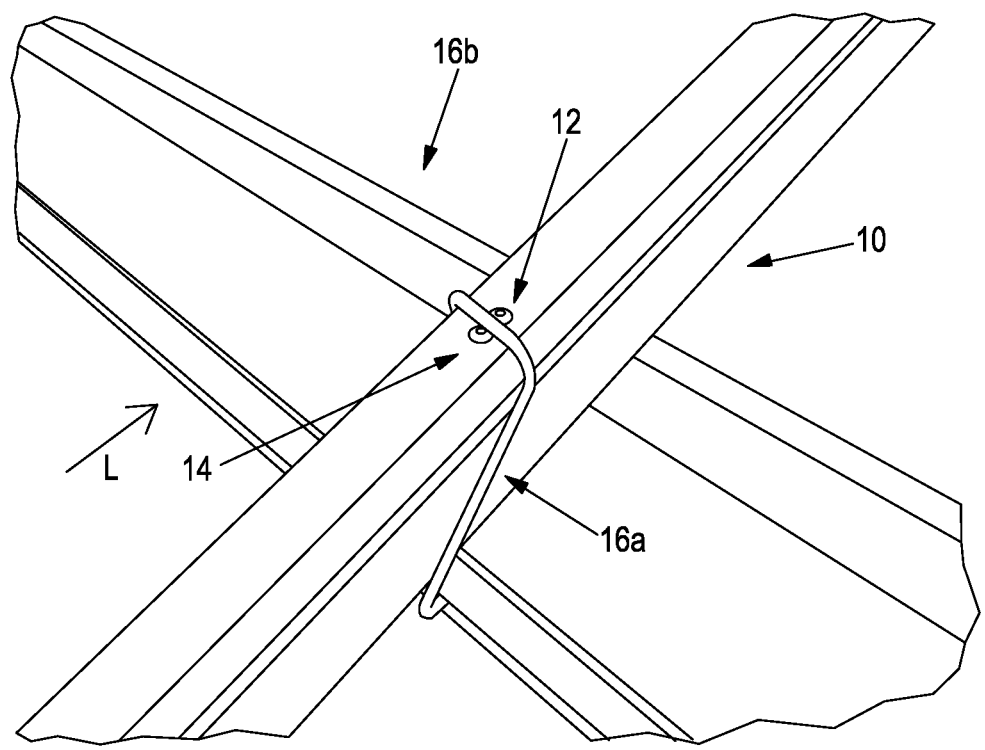
FIG. 5 shows a mounting track and a ceiling support in accordance with another embodiment of the invention for use in constructing a partition ceiling.

FIGS. 5 to 8 depict an alternative embodiment of the invention. With reference to FIG. 5, the track 10 is elongate and extends along a longitudinal axis L. The track comprises an alignment feature 12 which is located at a predetermined alignment position 14. The alignment feature 12 is configured to secure a first corresponding support member 16a. In this instance, the first corresponding support member 16a further supports a second corresponding support 16b. The support is also elongate, extending along its own longitudinal axis.

By way of recap, MF systems are known partition structures commonly used to create a frame when constructing a ceiling. In MF ceiling systems, primary support tracks/channels (which may be known as an MF7) are fixed in place (for example to the structural ceiling of a building) and secondary supports (also known as ceiling sections and/or an MF5) are suspended perpendicular to and underneath the primary support tracks to form a frame which supports ceiling panels. The ceiling sections may be suspended underneath the primary support channels using connecting clips. A clip may be understood to be any suitable connector or fastener, and may be, for example, an MF9 clip. The MF9 clip comprises a length of metal rod, shaped with a central rectangular u-shaped portion configured to hook over a primary track, and two end portions configured to each engage with the underneath of a respective lip of a support.

Referring back to FIGS. 5 to 8, a track 10 in the form of a primary support channel may be configured to receive a first support member 16a in the form of a clip. The clip 16a is used to secure the track 10 to the support 16b in the form of a ceiling section. The clip 16a is therefore used as a first support member to support the support 16b beneath the track 10. Typically the support 16b is supported such that its longitudinal axis is perpendicular to that of the track 10. Ceiling panels, for example, in the form of plasterboard can then be fixed underneath the support 16b.

Figure 6A:
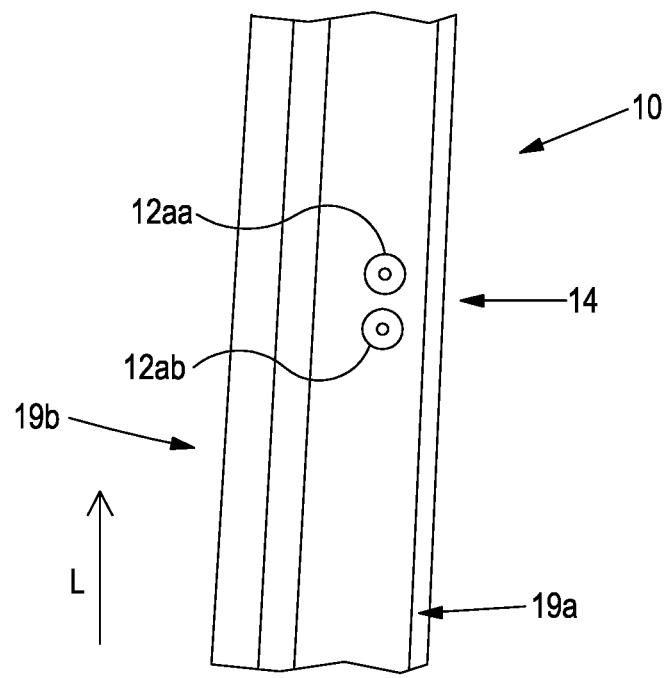
FIGS. 6A and 6B show the alignment feature of the mounting track shown in FIG. 5.
Figure 6B:
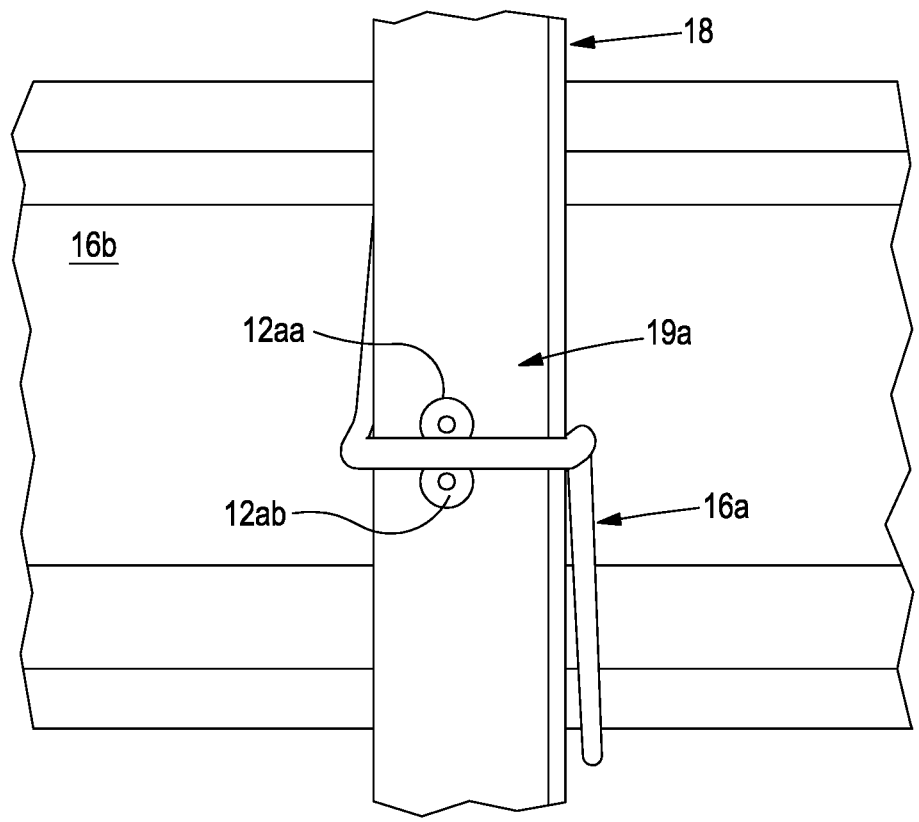

With reference to FIGS. 6A and 6B, the mounting track 10 according to this embodiment comprises three portions: a base 18, and opposing first and second side flanges 19a, 19b, which extend in the same direction from opposite edges of the base. The first and second side flanges 19a, 19b are generally parallel to each other, and are generally perpendicular to the base 18. The base and opposing side flanges 19a, 19b cooperate to form a web or channel. The channel can be said to be C-shaped. The base and opposing side flanges 19a, 19b extend along the longitudinal axis L, hence defining a channel extending along the longitudinal axis L.

The channel can be said to comprise an 'inner surface' of the track 10, where the inner surface comprises a first surface of the base, a first surface of the first side flange 19a, and a first surface of the second side flange 19b, where the first surfaces of the flanges face each other, and the first surface of the base joins the two first faces of the flanges. By contrast, the 'outer surface' of the track 10 may be said to comprise second surfaces of the first and second side flanges, where the second surfaces of the first and second side flanges face away from each other, and the second surface of the base, where the second surface of the base joins the second surfaces of the side flanges. In this way each second surface generally faces in the opposite direction to its respective first surface.

The track 10 is configured to receive a corresponding support member 16a on the outer surface of the track 10. As such, the alignment feature 12 is associated with (or formed on) the outer surface of the track 10. In this example, the alignment feature 12 comprises two protrusions 12aa, 12ab which cooperate to form a valley (or notch, groove, trough or depression) between them. That is, a recess in (the outer surface of) the track is formed by the two protrusions. The size and spacing of the two protrusions 12aa, 12ab, is configured to centre a received support member (clip) 16a between the two protrusions 12aa, 12ab. Hence, the protrusions 12aa, 12ab may secure a clip 16a at the alignment position 14. In a portion of the track 10 with no alignment features 12, a clip 16a may be freely slidable along the longitudinal axis L.

In the depicted example the alignment feature 12 is associated with the first side flange 19a but it should be understood that it may be provided instead or additionally on the base. Furthermore, the alignment feature 12 may also be associated with the second side flange 19b (e.g. generally identical protrusions to those on the first side flange may also be provided in the second side flange). In such embodiments, as will become clear from the description below, it will be possible to make use of the alignment feature regardless of whether, in use, the first or second side flange is orientated facing upwards.

The alignment feature 12 in this embodiment of the track 10 is a recess (defined by the adjacent cooperating protrusions). The recess of the track receives a projection of the support member, the projection taking the form of the centre portion of the clip. The centre portion of the clip may be said to take the form of a projection which extends between a pair of opposed outwardly extending arms.

The alignment feature is configured to provide a centring force to the support member 16a. That is, the alignment feature 12 is provided to urge the support member 16a towards the alignment position 14 which corresponds to the position of the recess. In the depicted example, this is done by providing two protrusions cooperating to form a valley. The support member 16a may be configured to apply a force to the track which is generally the same as the direction in which the recess extends into the track. In this way, the force applied by the support member to the track urges the support member into the recess. For example, if the support member is an MF9 clip, the clip is configured such that when it is clipped underneath each lip of the MF5 support, the clip exerts a force on the track in a direction which is generally perpendicular to the surface of the track on which the centre point of the clip rests, and which is towards the MF5 support. Furthermore, given that, in use, the support member is used to hang the support below the track, gravity may additionally or alternatively urge the support member towards the track.

However, it should be understood that a number of different ways may be used to enable the alignment feature to provide a centring force to the support member. For example, rather than two protrusions defining a valley between them, a recess may be provided directly in the outer surface of the track 10 to centre the support member 16a. The recess may have any appropriate cross-section, e.g. V-shaped or U-shaped.

In the depicted example the protrusions which define the recess between them are generally conical. However, the protrusions (and therefore recess defined therebetween) may be of any appropriate different shape, for example hemispherical or angular (e.g. having an inverted V-shaped cross-section), and may be elongated (such that they extend across the surface of the track in which they are formed). The spacing between the two protrusions 12a, 12b may be altered too, for example depending on the size of support member used. By way of example MF9 clips have a standard gauge of 2.65 mm (0.1 inches).

In the depicted example, the alignment feature 12 is configured to engage with a common MF9 clip 16a. A portion of the clip 16a forms a protrusion which may hook over the track 10. As such, a recess is provided (that is, a recess defined by the space between two protrusions 12a, 12b), which may receive the protrusion of the clip 16a. It should be understood that other alignment features 12 may be provided for use with other support members. For example, a clip may be provided which comprises a recess. In this case, a corresponding protrusion may be provided on the track to be received by the recess of the clip.

In conventional partition structures, for example conventional MF ceiling systems, MF5 channels are attached to MF7 tracks using MF9 clips to form a frame. In conventional systems, the frame must be well aligned (and there are industry standards regarding the required spacing of tracks and channels) but no alignment features are provided. Consequently, to correctly align and space the MF7 and MF5 members to create an adequate frame, much measurement is required. This is typically performed with a tape measure and results in large amounts of time spent by the operative. A track 10 according to the present invention may be used with conventional support members such as MF9 clips and corresponding supports such as MF5 channels, but greatly speeds up the measurement and alignment process by providing alignment features at predetermined locations/spacings.

In the present embodiment the alignment feature may be said to releasably secure the partition support member (clip) at the alignment position when the partition support member (clip) is received by the track. This is because the recess of the alignment feature, which is defined between the two protrusions, has a relatively shallow depth. This means that, if movement of the support member along the track is required, the operative can apply sufficient force (without the use of tools) to urge the support member over one of the protrusions and thereby release the support member from its secured engagement at the alignment position with the track. In some embodiments this movement may be accomplished when the support member in the form of a clip is clipped to both sides of the support (e.g. MF5 channel). In other embodiments this movement may be accomplished when one or more of the ends of the clip are disengaged from the support.

The alignment feature may be configured such that it permanently secures the clip at the alignment position. For example, a locking mechanism may be provided such that, once the support member is inserted into (or received by) the alignment feature, it is permanently secured. Such locking mechanisms may include a resiliently biased member such as a jaw. The resiliently biased member may be operable such that it is biased towards a closed state that grips the clip at the alignment position. The jaws may be configured to open when the clip is in the vicinity, for example as the clip is pushed or pulled towards the jaws, and close when the clip is located within the jaws. The jaws may be user operated. The area between two jaws may be considered a recess between said jaws. A single jaw or more than two jaws may be used. Alternatively, other types of locking mechanism which will be known to a person skilled in the art may be used, for example mechanical fasteners such as bayonet mounts.

The alignment feature may also be configured such that it semi-permanently secures the support member at the alignment position. Semi-permanent in this instance is intended to mean that the support member is not intended to be released in normal use, but that, if required, it may be released without permanently damaging the support member or track. Semi-permanent may mean that the support member cannot be simply slid along the track as with the releasable embodiment, but that it can be released by the user if needed. For example, with a bayonet-type mount, the clip may be inserted into an L-shaped or T-shaped slot to lock it in place and reduce sliding along the longitudinal axis, but the clip may be slid out of the L-shaped or T-shaped slot to release it again.

In some embodiments, a releasable alignment feature may be considered to allow some movement of the clip along the longitudinal axis of the track, but preferentially secure the clip at the alignment position. A permanent or semi-permanent alignment feature may be considered to generally inhibit such longitudinal movement of the clip once it has been secured. A track comprising an alignment feature that can be permanently or semi-permanently secured may be beneficial as it may provide an easier and/or more secure method for assembling a partition support structure with correctly spaced support members.

The track 10 may comprise a second alignment feature 12b, as best seen in FIG. 7. In this example, the track 10 has a first alignment feature 12a at a first predetermined alignment position 14a and a second alignment feature 12b at a second predetermined alignment position 14b. A benefit of a track 10 comprising multiple alignment features 12 is that the alignment and spacing between adjacent support members (and hence adjacent supports) may be predetermined. That is, a support member may be fixed at the first alignment position 14a and a second support member may be fixed at the second alignment position 14b such that the spacing between the first and second support member (and hence the first support supported by the first support member, and the second support supported by the second support member) is predetermined. As such, a support structure or frame may be easily and quickly assembled with correct alignment and spacing.

Building regulations and conventions may require specific spacing between supports (and hence support members) within a partition support structure, for example the spacing between channels in an MF ceiling frame. Typically, a spacing of 45 cm (17.7 inches) is required. However, in specific types of ceiling other spacings may be used, for example 30 cm (11.8 inches) or 90 cm (35.4 inches). Typically, an equal spacing between each support member is required i.e. the spacing between a first and second support member is the same as a spacing between a second and third support member, etc. As such, it may be beneficial to provide a track 10 with a plurality alignment features 12a, 12b equally spaced by a predetermined distance, for example 45 cm (17.7 inches).

FIG. 7 shows a track 10 where the first and second alignment locations 14a, 14b, and hence first and second alignment features 12a, 12b, are spaced by an alignment length A. In a preferred example, this alignment length is 45 cm (17.7 inches). By fixing a first and second support member at first and second alignment locations 14a, 14b, a frame may be formed where first and second support members (and hence first and second supports) are spaced by an alignment length A. It should be noted that the alignment length A is measured along the longitudinal axis L of the track 10.

The track 10 may be manufactured, and hence provided to the user, in standard lengths. However, the user may wish to build a partition structure longer than the standard length of one track. In this instance, two or more tracks may be used to form an extended track arrangement. When using tracks to build ceilings, two tracks cannot be simply laid in abutment as with some of the above embodiments (this is because they are load bearing and are only supported at discrete locations along their length). Instead, it may be necessary to fix adjacent tracks together in a more permanent means, for example using a screw, crimping or other means. Fixing tracks together may provide additional strength to the support structure. To fix tracks together, a small amount of overlap may be required between the two tracks.

As seen best in FIGS. 7 and 8, the track may comprise a first datum feature at a first longitudinal end of the track and a second datum feature at the second longitudinal end of the track. The first and second datum features are configured such that when the first end of a first track and the second end of a second track, identical to the first track, are placed adjacent each other and overlapped along the longitudinal axis, the first datum feature of the first track and second datum feature of the second track engage and restrict relative movement between the first and second tracks along the longitudinal axis.

In the present embodiment the first datum feature 60 is located a first datum distance C from the first end of the track. The first datum feature 60 is also located at a second datum distance D from the alignment feature which is closest to the first end of the track. The first and second datum distances C, D, are measured along the longitudinal axis L. The second datum feature 60a is the second end of the track itself. The second datum feature 60a is located a third datum distance E (along the longitudinal axis) from the alignment feature which is closest the second end of the track.

With reference to FIG. 7B, the first datum feature 60 and second datum feature 60a are provided such that, when a first track 10a is overlapped along the longitudinal axis with a second track 10b, identical the first track 10a, such that the first and second datum features 60, 60a engage, the amount of overlap between the first and second tracks (i.e. datum distance C) along the longitudinal axis is predetermined.

The second spacing length D and third spacing length E may be configured such that, when the first end of a first track 10a is overlapped with the second end of a second track 10b, which is identical to the first track, the longitudinal spacing between the first alignment feature 12a of the first track closest the first end of the first track 10a and a second alignment feature 12c of the second track 10b is equal to the alignment spacing A. In other words, the second datum distance D, third datum distance E, and alignment length A are configured such that D+E=A. In this way, any desired length of extended track arrangement may be assembled by placing multiple tracks in overlapped end to end arrangement where the first datum feature of each relevant track is engaged with the second datum feature of an adjacent track such that each of the alignment features of the multiple tracks is equally spaced from an adjacent alignment features (e.g. by alignment length A).

In a specific example, the first datum distance C is 15 cm (5.9 inches), the second datum distance D is 15 cm (5.9 inches) and the third datum distance E is 30 cm (11.8 inches). This corresponds to an alignment length A or spacing (of 45 cm (17.7 inches)) advantageous to the building requirements for a common partition, for example an MF-type ceiling partition.

The first datum feature 60 may comprise a protrusion, recess or edge. The second datum feature 60a may also comprise a protrusion, recess or edge. All that is required is that when the first end of a first track and the second end of a second track, identical to the first track, are placed adjacent each other and overlapped along the longitudinal axis, the first datum feature of the first track and second datum feature of the second track engage and restrict relative movement between the first and second tracks along the longitudinal axis. Suitable pairs of first datum feature and second datum feature include: i) protrusion and recess (or vice versa); ii) protrusion and edge (or vice versa); and iii) recess and edge (or vice versa). In another example, the first and second datum features may both comprise an aperture through their respective track. The datum features may then be aligned and a fastener may be passed through bother apertures in order to secure the two tracks together. In such an embodiment one of the apertures in combination with the fastener may be said to constitute the first datum feature, and the other aperture may be said to constitute the second datum feature.

Figure 8A:
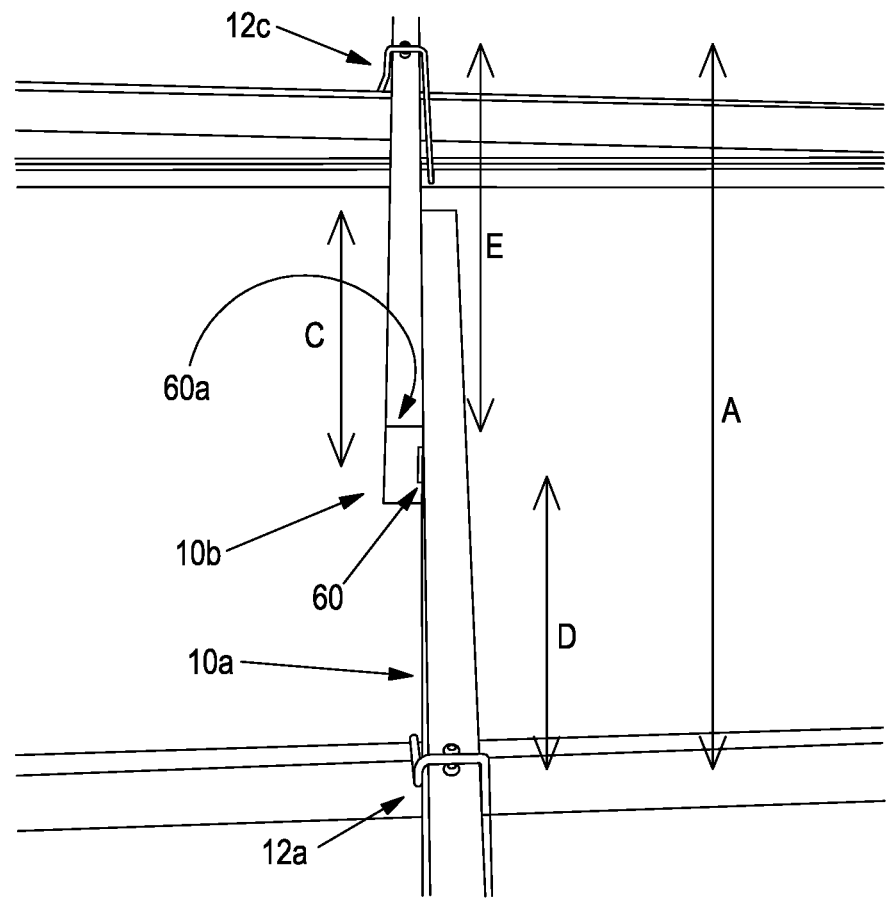
FIGS. 8A and 8B show two mounting tracks coupled via a spacing feature.
Figure 8B:
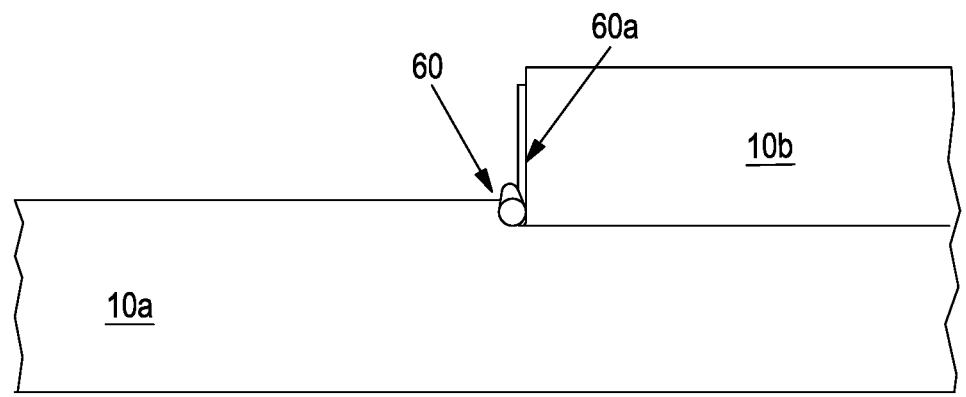

With reference to FIGS. 8A and 8B, the first datum feature 60 may comprise a protrusion on (an outer, rear surface) the first track 10a. The protrusion extends away from the surface on which it is located. An elongate protrusion (which extends across the surface of the track generally perpendicular to the longitudinal axis) is depicted, but the protrusion may be of any shape. The protrusion may be provided such that, when a second track 10b is placed adjacent the first track 10a (such that the longitudinal axes of each track are parallel, and the first and second track can be said to overlap longitudinally; in the present case, the overlapping track may be said to be back to back), the edge 60a of the overlapping end of the second track 10b abuts the protrusion 60. In this way, the second track 10b may only overlap the first track 10b by a spacing length C. As discussed above, this results in the spacing between the alignment feature 12a (of the first track) closest the overlapping end of the first track 10a to be spaced (along the longitudinal axis) from the alignment feature 12c (of the second track) closest the overlapping end of the second track 10b to be spaced by the desired and predetermined alignment length A.

In operation, the second track 10b may be placed atop the first track 10a and moved along the longitudinal axis L until the end 60a of the second track 10b abuts the protrusion 60. The first and second track may then be permanently secured together, for example by a screw or by crimping. Alternatively, the datum features themselves may be permanently securable, for example using fixing mechanisms such as a press fit or a latch. Permanently securable datum features may be configured similarly to the permanently securable alignment features described further above.

When assembling a frame (partition support structure) for a ceiling, it may be required to join a first and second track in a particular orientation, for example back to back. Joining in a different orientation may result in a weaker frame. Joining in a different orientation may void the warranty offered by some partition support structure suppliers. The provision of datum features to join a first and second track may encourage correct orientation of joined tracks. That is, the datum features may be configured such that they only engage when in the correct orientation. For example, a projection or recess may be provided on the outer surface of the first track and may engage with the other of a projection or recess on the outer surface of the second track, such that for correct engagement the tracks must be placed back to back.

As already discussed, the first and second datum features may take any appropriate form. For example, in another embodiment of invention the first track may include a first datum feature in the form of a recess at a spacing D from the relevant alignment feature of the first track; and the second track may include a second datum feature in the form of a protrusion that corresponds to said recess, where the protrusion is at a spacing E from the relative alignment feature of the second track. In this way, when the two tracks are overlapped such that the recess receives the protrusion, the longitudinal spacing between the relevant alignment feature of the first track and the relevant alignment feature of the second track will be a desired and predetermined alignment spacing.

Conventional ceiling tracks, for example MF7 tracks, are generally 3.6 m (11.8 feet) in length. It may be beneficial to provide a track with datum features with a different track length. Datum features provided at a datum distance C from the end of the track may require a predetermined amount of overlap distance i.e. datum distance C, to provide a desired alignment length A. The applicant has found that a ceiling track length of around 3.75 m (12.3 feet) or 3.3 m (10.8 feet) is beneficial to provide commonly used alignment lengths A, for example an alignment length of 45 cm (17.7 inches).

It may be necessary to align multiple parallel tracks, for example to secure a support perpendicularly between two parallel tracks. In such applications, a first alignment feature on the track may be horizontally aligned to a first alignment feature of a (parallel, laterally spaced) second track, for example with a laser alignment tool, although, of course, any appropriate alignment method may be used.

To aid these alignment processes, for example to speed up and/or increase the accuracy of alignment processes, a visible marker may be provided at one or more alignment positions. The marker may indicate a suitable position/portion to be aligned by an alignment tool such as a laser alignment tool or a length of line. Advantageously, this marker may be located at the predetermined alignment position. The marker may be associated with the alignment feature. For example, in the depicted example the marker may be formed by one of the protrusions or the valley of the alignment feature. In another embodiment the marker may be associated with one of the datum features.

Alternatively the marker may be a separate feature to the alignment feature or datum features. The marker may be a projection or a recess or any other sort of visible mark. For example, the marker may take the form of a feature which is printed, painted or affixed to the track. The marker may be located at an appropriate marker position along the length of the track. Of course, for alignment to be possible, all of the tracks to be aligned will have been manufactured such that the marker position is the same for each.

It will be appreciated that the embodiments discussed above may be subject to any number of appropriate modification without departing from the scope of the invention as understood by the person skilled in the art and defined by the following claims.

What is claimed is:

1. A track mounting system comprising:
a partition support structure mounting track comprising a base and first and second side flanges which extend from the base and cooperate to define a channel therebetween, the track being elongate such that the track extends along a longitudinal axis, and the track comprising an alignment feature located at a predetermined alignment position along the longitudinal axis of the track on at least one of the first side flange, the second side flange and the base, the alignment feature configured to secure a partition support member at the alignment position such that the partition support member is received by the track in an assembled configuration, and the alignment feature comprising one of a projection or recess configured to engage with the other of a projection or recess of the partition support member, wherein the partition support member is configured support a partition, and wherein the partition is a wall such that the partition support member is a wall element support member;
wherein the track defines said channel extending along the longitudinal axis, wherein the alignment feature is configured to secure the partition support member at the alignment position in the assembled configuration, the track further comprising a discrete visible marker, which is a separate feature to the alignment feature, the visible marker being located at a predetermined marker position along the longitudinal axis of the track, said visible marker being configured for aligning, using an alignment tool, with a further visible marker of a further track, identical to said track, spaced vertically or laterally from the track, to thereby align the track with said further track.

2. The track mounting system according to claim 1, wherein the alignment feature is configured to releasably secure said partition support member at the alignment position.

3. The track mounting system according to claim 1, wherein at least a portion of the alignment feature is resiliently deformable such that at least one of A) when the alignment feature secures the partition support member at the alignment position said at least a portion of the alignment feature is resiliently deformed or B) when the alignment feature secures the partition support member at the alignment position said at least a portion of the alignment feature is resiliently deformed.

4. The track mounting system according to claim 1, wherein the alignment feature is spaced along the longitudinal axis from a first longitudinal end of the track by a second predetermined alignment length.

5. The track mounting system according to claim 1, wherein the alignment feature is a first alignment feature, and further comprising a second alignment feature spaced from the first alignment feature along the longitudinal axis by a first predetermined alignment length.

6. The track mounting system according to claim 5, wherein the first alignment length is one of: approximately 11.8 inches, approximately 15.7 inches or approximately 23.6 inches.

7. The track mounting system according to claim 1, wherein the partition support member is a C-stud and the alignment feature is a projection configured to project into a portion of a sight line of said C-stud.

8. A partition support structure comprising the track mounting system according to claim 1, said partition support member, and a partition element, wherein the track receives the partition support member at the alignment position, and the partition element is supported by the partition support member.

9. The partition support structure according to claim 8, wherein the alignment feature is a first alignment feature, and wherein the track further includes a second alignment feature spaced from the first alignment feature along the longitudinal axis by a predetermined alignment length, wherein the partition support structure further includes a second partition support member, wherein the track receives the second partition support member at a second alignment position, and the partition support member and second partition support member support the partition element between the partition support member and second partition support member.

* * * * *